United States Patent [19]

Onan et al.

[11] Patent Number: 4,972,174

[45] Date of Patent: Nov. 20, 1990

[54] MOTORCYCLE TURN SIGNAL CONTROL CIRCUIT

[76] Inventors: Lance C. Onan, 6718 Revere Ave., Wauwatosa, Wis. 53213; James Scholler, 835 Garvens Ave., Brookfield, Wis. 53005; Douglas E. Stehr, 6055 Seneca Trail, Hales Corner, Wis. 53130; Hugh R. Putnam, 4662 N. 70th St., Milwaukee, Wis. 53218

[21] Appl. No.: 383,025

[22] Filed: Jul. 21, 1989

[51] Int. Cl.[5] .............................................. B60Q 1/40
[52] U.S. Cl. ..................................... 340/477; 340/471; 340/476; 340/642
[58] Field of Search ............... 340/477, 476, 475, 471, 340/641, 642; 364/424.01

[56] References Cited

U.S. PATENT DOCUMENTS

| | | | |
|---|---|---|---|
| 3,747,062 | 7/1973 | Williams | 340/475 |
| 3,876,976 | 4/1975 | Cross, Jr. | |
| 3,931,529 | 1/1976 | Williamson, Jr. | |
| 4,030,066 | 6/1977 | White | |
| 4,058,797 | 11/1977 | Sekiguchi et al. | 340/477 |
| 4,086,565 | 4/1978 | Schorter | 340/475 |
| 4,125,827 | 11/1978 | Roudebush, Jr. | |
| 4,173,750 | 11/1979 | Riba | 340/458 |
| 4,306,218 | 12/1981 | Leconte et al. | 340/477 X |
| 4,333,071 | 6/1982 | Kira et al. | 340/477 |
| 4,348,655 | 9/1982 | Goertler et al. | 340/475 |
| 4,349,810 | 9/1982 | Kugo et al. | 340/458 |
| 4,358,751 | 11/1982 | Roudebush, Jr. | 340/477 |
| 4,363,022 | 12/1982 | Manacci | |
| 4,398,175 | 8/1983 | Gamba | |
| 4,660,020 | 4/1987 | Miyamaru et al. | 340/477 |
| 4,745,339 | 5/1988 | Izawa et al. | 340/462 X |

*Primary Examiner*—Joseph A. Orsino
*Assistant Examiner*—Brian R. Tumm
*Attorney, Agent, or Firm*—Arnold J. Ericsen; Allan O. Maki; C. Thomas Sylke

[57] ABSTRACT

A turn signal control circuit has a power source, left and right turn signal inputs, a speed detection input and circuitry for conditioning the power source voltage and current as well as the input signals for proper operation. When a turn signal switch provides an input signal to a logic controller, the circuit begins flashing the respective turn signal. Upon release of the switch, a microprocessor reviews the vehicle speed by way of a speedometer input line and references a lookup table to determine the proper distance at which to turn off the signal. Generally, the faster the vehicle is travelling, the longer the turn signals are left on. Various manual cancellation options are also available to the motorcycle operator. A four-way flasher sysem is operated by simultaneously pushing the two turn signal switches, remaining on until both switches are again simultaneously pressed. Furthermore, an electrical "bulb out" detection system warns the motorcycle operator of a burned out light bulb and operates signals at a substantially slower rate when a bulb is burned out.

14 Claims, 2 Drawing Sheets

MOTORCYCLE TURN SIGNAL CONTROL CIRCUIT

CROSS-REFERENCE TO RELATED APPLICATIONS, IF ANY:

This application is being filed simultaneously with the application co-owned by the applicant entitled "Electrical Malfunction Detection System". U.S. Ser. No. 07/383,728, filed on July 24, 1989.

BACKGROUND OF THE INVENTION

1. Field of the Invention

The present invention relates generally to motorcycles. More particularly, the present invention relates to turn signal and directional light control systems for motorcycles. Even more particularly, the present invention relates to a circuit configuration designed to control certain aspects of the operation and functioning of directional signals on a motorcycle.

2. Description of Related Areas of Art

Automatically cancelling the turn signals on a motorcycle is considerably different from doing so on an automobile. An automobile's turn signals are typically turned off by rotation of the steering wheel. However, at speeds above approximately 15 mph, the motion of the handlebars on a motorcycle is nearly imperceptible, making steering cancellation a poor method.

Some motorcycle manufacturers cancel the signal after a single, preset distance or time. Oversimplification like this is not desirable because it does not accommodate differing situations. Still other systems have elaborate mechanical and electromechanical systems designed to detect changes in the motorcycle's vertical alignment, or gravitational and/or inertial effects. Such systems are typically complex, unreliable and cumbersome.

The prior art is replete with systems utilizing various physical response mechanisms to switch off turn signals after a turn has been completed. A wide variety of such electromechanical systems has been developed. Mercury switches are used in U.S. Pat. No. 3,876,976 issued to Cross, Jr. on Apr. 8, 1975 entitled "Tilt Actuated Directional Signal For Vehicles". Gravitational and inertial forces experienced by the vehicle due to inclination from its normally upright position or due to alteration in its direction of motion cause mercury switches to turn off turn signals. Similarly, a mercury switch is used in U.S. Pat. No. 3,931,529 issued to Williamson, Jr. on Jan. 6, 1976 and entitled "Turn Signal Indicator". The system disclosed in U.S. Pat. No. 4,363,022 issued to Manacci on Dec. 7, 1982 entitled "Self-Cancelling Motorcycle Turn Signal Which Recognizes Balance" also uses mercury switches adjusted to open when a motorcycle is returned to an upright position after tilting due to a turn.

In U.S. Pat. No. 4,030,066 issued to White on June 14, 1977 and entitled "Automatic Cancellation Means For Vehicle Turn Indicator Signals", the turn signals are turned off on completion of a turn by means of a gyroscope mounted on the vehicle and utilizing the precession movement of the gyroscope resulting from turning of the vehicle to actuate a signal cancelling means.

Two other patents utilize mechanical linking systems to turn off signals on a motorcycle. U.S. Pat. No. 4,125,827 issued to Roudebush, Jr. on Nov. 14, 1978 entitled "Automatically Cancelling Turn Signal" turns off the turn signal upon upshifting of a motorcycle into a higher gear. Mechanical linkage responsive to a weight shift in the motorcycle in a turn is used to turn off the signals in U.S. Pat. No. 4,398,175 issued on Aug. 9, 1983 to Gamba entitled "Apparatus For Automatically Cancelling A Turn Signal".

The present invention incorporates a "burned out bulb detector" in addition to the signal canceller. In earlier devices developed to address this situation, electromechanical devices have been used to change operation of the turn signals in order to comply with legal and common sense safety standards and practices. For example, bimetallic springs, which physically behave differently when the lamp bulb is burned out, have been used along with a device having contacts attached through the spring.

A turn signal control system circuit which overcomes the shortcomings, limitations and restrictions of prior devices would be a significant advancement in the art.

OBJECTS AND SUMMARY OF THE INVENTION

It is an object of the present invention to provide a turn signal control system which does not require the use of mechanical and/or electromechanical devices for operation.

It is another object of the present invention to provide a turn signal control system utilizing advanced solid state intelligence to adjust operation of the system to various situations.

It is a different object of the present invention to provide a turn signal control system which utilizes a solid state "bulb out" inspection system for determining when a light bulb is burned out.

It is still another object of the present invention to provide a turn signal control system having the ability to operate without an electric ground and to withstand low start up voltages.

It is still a different object of the present invention to provide a turn signal control system having an optional time control cancelling system.

A different object of the present invention is to provide a turn signal control system having a four-way flasher feature without requiring a special switch for activation.

How these and further objects of the invention are accomplished with be described by reference to the following description of the invention taken in conjunction with the FIGURES. Generally, however, the objects are accomplished in a turn signal control circuit having a power source, left and right turn signal inputs, a speed detection input and circuitry for conditioning the power source voltage, current and input signals for proper operation. When a turn signal switch provides an input signal to a logic controller, the circuit begins flashing the respective turn signal. Upon release of the switch, a microprocessor in the logic controller reviews the speed at which the vehicle is travelling by way of the speedometer input line. The microprocessor references a lookup table to determine the proper distance at which to turn the signal off. Generally, the faster the vehicle is travelling, the longer the turn signals are left on. Various manual cancellation options are also available to the motorcycle operator.

A four-way flasher system is provided which is operated by simultaneously pushing the two turn signal switches, the four-way flashers remaining on until both switches are again simultaneously pressed. An electrical "bulb out" detection system is also provided in which the motorcycle operator is warned of a burned out light bulb. The flashers operate at a substantially slower rate when a bulb is burned out.

Alternatively, if a speedometer input line is not available, an alternate input line may be provided to operate a purely time controlled cancellation system for the turn signals.

Other variations and modifications of the invention will become apparent to those skilled in the art after reading the specification and are deemed to fall within the scope of the present invention if they fall within the scope of the claims which follow the description of the preferred embodiment.

DESCRIPTION OF THE DRAWINGS

In the FIGURES, like reference numerals refer to like components.

DESCRIPTION OF THE PREFERRED EMBODIMENT

General Configuration

Figure 1:
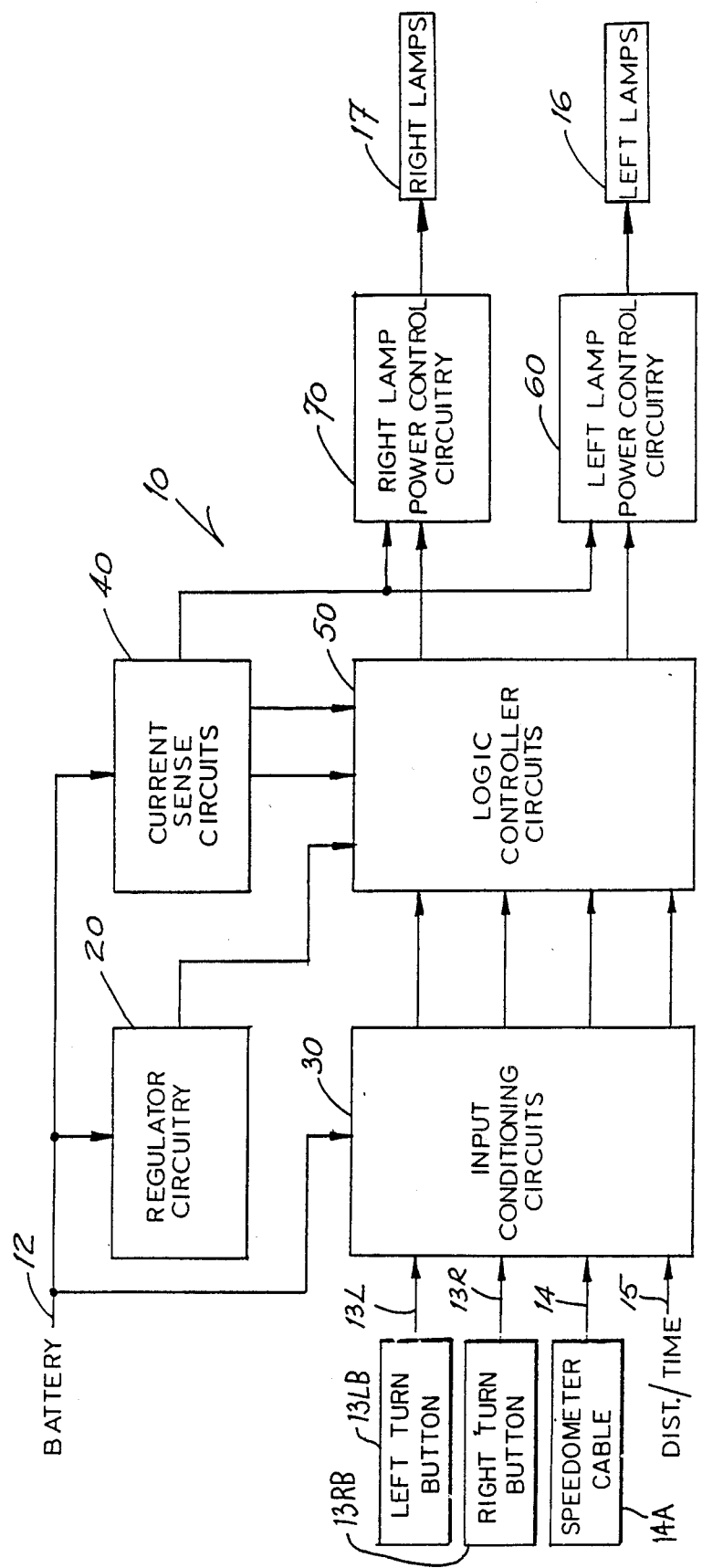
FIG. 1 is a block schematic diagram of the turn signal control system of the present invention.

A block schematic diagram of the circuit 10 is shown in FIG. 1. The entire system is powered by the motorcycle's battery line 12. The operator has a left turn switch 13L and a right turn switch 13R at hand to generate indicator signals.

An input line 14 from the speedometer cable sends a pulse for every rotation of the speedometer cable of the motorcycle. If this speedometer hookup is unavailable, an alternate accessory line 15 can be used to provide input signals. For purposes of most of this description, and unless noted otherwise, line 14 will be used.

Figure 2:
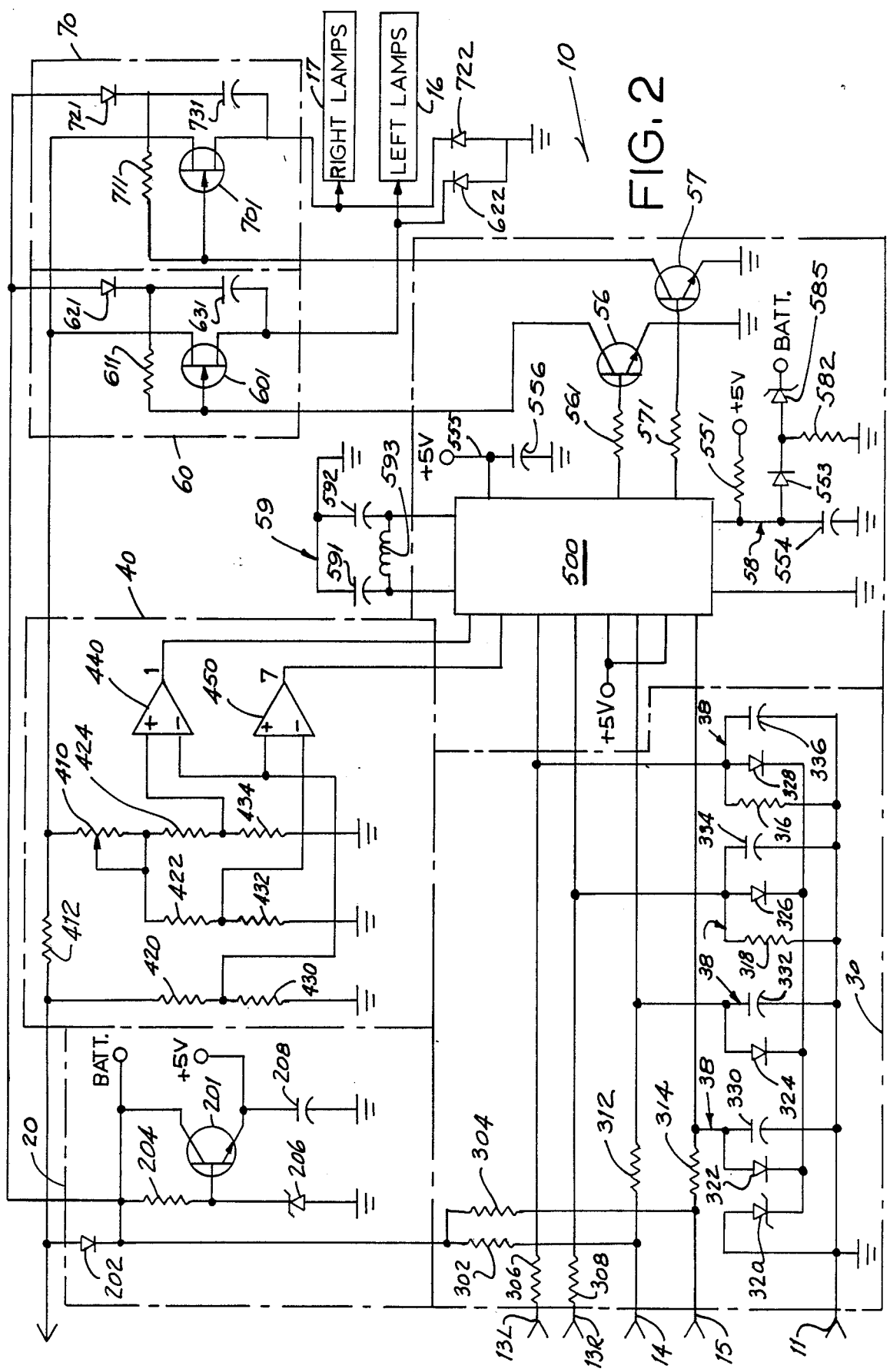
FIG. 2 is an electrical schematic of the turn signal control system of the present invention.

In FIG. 1, regulator circuitry 20 converts the voltage supplied by battery 12 to that usable by solid state components elsewhere in the circuit. In FIG. 2, diode 202 ensures no current backflow to the regulator circuitry (e.g. in case of reverse battery polarity). Resistor 204, zener diode 206 and capacitor 208 are connected to transistor 201 to provide 5 VDC at the transistor's emitter and battery voltage at the transistor's collector.

Input signals from lines 13L, 13R, 14 and 15 (if used) are likewise conditioned in the input conditioning circuits 30 shown in FIG. 1. This circuitry, like that of the regulator circuitry 20, converts input signals into signals usable by the system's solid state logic components. The conditioning circuits use resistor pairs 302, 312 and 304, 314 to bias up the signals on lines 14 and 15 (where applicable) to usable voltage levels for the microprocessor 500. Likewise, resistor pairs 306, 316 and 308, 318 bias down the voltages of incoming signals from the left and right turn signals, which are push button switches that provide a signal to the circuit 10 when depressed to a closed position. Input lines 13L, 13R, 14 and 15 are tied to diodes 320, 322, 324, 326, 328 and capacitors 330, 332, 334, 336, as illustrated in FIG. 2, to clamp the voltages and protect microprocessor 500 from signal spikes.

Current sense circuits 40 are used to detect burned out directional signal lamps. This is accomplished by monitoring the current flow to the left lamp control circuitry 60 and right lamp control circuitry 70, each of which controls the front and rear turn signal lamps on its respective side. Current sense circuits 40 also shut down circuit 10 if the current flow is too high. Circuits 40 thus establish a current "window" in which circuit 10 operates. The parameters of the window are controlled by variable resistor 410.

Resistor 412 acts as a low value resistor at which a voltage drop is measured to detect changes in current flow. Variable resistor 410 works with resistor pairs 420, 430; 422, 432; 424, 434 to provide input voltages to comparators 440, 450. Use of the output signals from comparators 440, 450 will be discussed in more detail below.

Data from the input conditioning circuits 30 and the current sense circuits 40 are transmitted to the logic controller circuits 50 where circuit 10 decides what, if any, functions to perform. The heart of logic controller circuits 50 is a microprocessor 500 having advanced operational intelligence in the form of a lookup table described in more detail below. Microprocessor 500 is powered through line 555 which uses capacitor 556 for noise filtering.

Microprocessor 500 includes a clock 59 composed of capacitors 591, 592 and inductor 593. Clock 59 is used to time pulses from speedometer line 14 to generate speed calculations used by microprocessor 500. The clock 59 may also be used, if the alternate time accessory line 15 is used, to measure a preselected time period before cancelling the desired turn signal.

A reset unit 58 is constructed of resistor 581 tied to 5 VDC, resistor 582, diode 583, capacitor 584 and zener diode 585 tied to ground and the battery voltage as shown in FIG. 2. Reset unit 58 resets microprocessor 500 when the circuit 10 is turned on and in the event the battery voltage dips low enough to create the possibility of an indeterminate state being inputted to or created in the microprocessor 500.

As noted above, input signals from the turn signal switches 13L, 13R have been properly biased down by protection unit 38. Signals from the speedometer 14 (or the accessory line 15) have been biased up by appropriate connection to the battery and clamped by unit 38 to prevent damage to the microprocessor 500. Also, signals representative of the current flow to the right and left lamps 17, 16 are generated by comparators 440, 450 and transmitted to microprocessor 500.

Output signals (pulses) from the microprocessor 500 are sent via resistor 561 to turn on transistor 56, thereby turning on the left lamp power control circuitry 60. Similarly, output signals (pulses) are sent through resistor 571 to turn on transistor 57 and right lamp power control circuitry 70.

In the preferred embodiment, right lamp power control circuitry 70 uses a voltage activated MOSFET transistor 701, resistor 711, diodes 721, 722 and capacitor 731 configured as shown in FIG. 2 so that when transistor 57 is turned on, transistor 701 is conducting and turns on the right lamps 17 in a manner and for a time period determined by the programming of microprocessor 500. Similarly, left lamp power control circuitry 60 uses a voltage activated MOSFET transistor 601, resistor 611, diodes 621, 622 and capacitor 631. These components are configured so that when transistor 56 is turned on, transistor 601 conducts, lighting the left lamps 16, again in a manner and for a time period determined by the programming of microprocessor 500.

Again, the entire circuit 10 operates without the use or need of mechanical switches such as relays, mercury switches or mechanisms responsive to gravitational and/or inertial effects. The programming of microprocessor 500 and operation of circuit 10 will now be described in relation to the above-described circuit configuration.

Operation

The operation of circuit 10 is based primarily on microprocessor 500 and input signals (pulses) received from left turn switch 13L, right turn switch 13R, speedometer line 14 and comparators 440, 450. Initially, microprocessor 500 is reset by unit 58.

During normal operation (i.e., when no lamp bulbs are burned out), the operator has three selections from which to choose in operating the motorcycle's turn signal lamps. Signal lamp activation is accomplished by depressing one or both of the switch buttons for a sufficient period of time to generate an enabling, readable pulse to the microprocessor 500.

Once the turn signal button is touched, microprocessor 500 begins flashing the appropriate signal lamp by sending pulses to either transistor 56 or transistor 57. When the button is released, microprocessor 500 reads the motorcycle's then present speed via speedometer cable line 14.

If the left switch button is pushed alone, the microprocessor 500 consults an internally programmed "look-up table" similar to Table I:

TABLE I

| Speed | Distance |
|---|---|
| 0–30 mph | 30 yds |
| >30–45 mph | 40 yds |
| >45–60 mph | 45 yds |
| >60 mph | 50 yds |

The speed value is determined by counting pulses from speedometer cable line 14 in a preselected time period measured by clock 59. These pulses represent turns of the speedometer cable itself. Microprocessor 500 then sends a series of normally spaced pulses to transistor 56, resulting in the pulsing of the left front and rear lamps 16. The pulsing continues until the first of four events occurs.

First, the left turn signal may be manually cancelled by pushing the left turn signal button again while the signal is still flashing. Second, if the right turn switch button is pushed, the left signal is cancelled and the right lamps 17 begin flashing. Third, if both left and right switch buttons are pushed simultaneously, all lamps 16 and 17 flash together (e.g. in case of an emergency). Finally, if none of these events occur, the left lamps 16 continue to flash until speedometer line 14 has transmitted enough pulses to indicate to microprocessor 500 that the cycle has traversed the distance prescribed by the lookup table.

Operation of right turn lamps 17 is analogous to that just described in relation to left turn lamps 16. Simultaneous flashing of all lamps 16 and 17 can be initiated at any time by sending simultaneous pulses for switch buttons 13L and 13R to microprocessor 500. This four-way flasher feature allows the operator to turn it on in a hands free operation. Other devices of this type have required inclusion of another switch. Cancellation of this four-way flasher operation is accomplished by subsequently depressing both buttons simultaneously again.

If a motorcycle is not equipped or retrofitted with the necessary mechanism to generate pulses based on the rotation of the speedometer cable, as sent on line 14 to microprocessor 500, then accessory line 15 can be employed. Microprocessor 500 can use a second program in this situation. When a left or right turn button is released, the appropriate lamps continue flashing for a specified time period (e.g. ten seconds). Manual cancellation of a signal and operation of the four-way flasher feature are the same as when line 14 is used.

When one or more of the lamp bulbs is burned out, it is necessary to warn the motorcycle operator. Federal safety standards also require that if a lamp bulb burns out, the turn signal must flash at a substantially slower rate. Current sense circuits 40 will detect the change in the voltage drop across and, therefore, current flow through low value resistor 412 due to an open circuit present in left lamps 16 or right lamps 17. Such a change in voltage drop or current flow will cause the output of comparators 440, 450 to change, altering the signal to microprocessor 500. Comparators 440 and 450 compare the measured current flow against a preselected level or range which represents the current flow through an operational lamp. The signals transmitted by the comparators 440 and 450 are referred to hereinafter as "fourth" and "fifth" signals.

A change in input to the microprocessor 500 from comparators 440, 450 slows down the rate of pulses sent to turn on either transistor 56 or transistor 57 to thereby slow down the lamp flashing rate. Additionally, a visual and/or audio warning can be provided to the operator. For example, a dashboard indicator light, which usually flashes when any of the turn signal lamps is being used, can be turned on to provide a steady rather than flashing light.

This solid state "bulb out" detection system avoids the use of electromechanical devices, such as bimetallic springs, which have been used in the past. A purely electrical system is used instead.

Variations, modifications and other applications will become apparent to those presently of ordinary skill in the art. Therefore, the above description of the preferred embodiment is to be interpreted as illustrative rather than limiting. The scope of the present invention is limited only by the scope of the claims which follow.

What is claimed is:

1. A system for operating the turn signal of a motorcycle having right lamp means and left lamp means, said system comprising:
   (a) electronic control means, including memory means;
   (b) a right turn button connected to said control means;
   (c) a left turn button connected to said control means;
   (d) means for measuring the speed of the motorcycle, said speed measuring means sending a signal representative of the motorcycle's speed to said control means;
   wherein when only said left turn button is pushed, said left lamp means flashes for a period based on said speed signal and determined by said memory means;
   further wherein when only said right turn button is pushed, said left lamp means flashes for a period based on said speed signal and determined by said memory means; and
   further wherein said said left and right turn buttons are pushed simultaneously, both said left and right lamp means flash until said left and right turn buttons are pushed simultaneously again.

2. A system for controlling the operation of turn signal lights on a motorcycle having right lamp means and left lamp means, said system comprising:
 (a) means for generating a first signal indicating activation of a left signal switch;
 (b) means for generating a second signal indicating activation of a right signal switch;
 (c) means of generating a third signal representative of the speed of the motorcycle;
 (d) electrical means for generating fourth and fifth signals indicating whether said right and left lamp means respectively, are operating in a preselected manner;
 (e) means for processing said first, second, third, fourth and fifth signals and controlling said right and left lamp means;
 (f) wherein when said fourth and fifth signals indicate said fright and left lamp means are operating in said preselected manner, then
  (i) when said processing means receives said first signal, said right lamp means flashes at a first rate for a predetermined period;
  (ii) when said processing means receives said second signal, said left lamp means flashes at a first rate for a predetermined period;
  (iii) when said processing means simultaneously receives said first and second signals, both of said right and left lamp means flashes at a first rate for a selectable period;
 (g) further wherein wherein when said right and left lamp means are not operating in said preselected manner, then
  (i) when said processing means receives said first signal, said right lamp means flashes at a second rate for a predetermined period;
  (ii) when said processing means receives said second signal, said left lamp means flashes at said second rate for a predetermined period;
  (iii) when said processing means simultaneously receives said first and second signals, both of said right and left lamp means flashes at said second rate for a selectable period;
 (h) further wherein said second rate is slower than said first rate and said predetermined periods are abased on said third signal.

3. A system for operating the turn signals of a motorcycle having right lamp means and left lamp means, said system comprising:
 (a) electronic control means, including a microprocessor having memory means wherein said microprocessor has a lookup table programmed therein, said table defining maximum distances for which said left and right lamp means flash depending on the speed of said motorcycle;
 (b) a right turn button connected to said control means;
 (c) a left turn button connected to said control means;
 (d) means for measuring the speed of the motorcycle, said speed measuring means sending a signal representative of the motorcycle's speed to said control means;
 wherein when only said left turn button is pushed, said left lamp means flashes for a distance not exceeding a minimum distance based on said speed signal and determined by said memory means; and further wherein when only said right turn button is pushed, said right lamp means flashes for a distance not exceeding a minimum distance based on said speed signal and determined by said memory means.

4. The system of claim 3 wherein said motorcycle has a speedometer cable which rotates at a rate representative of said motorcycle's speed and further wherein said speed measuring means provides said control means with electrical signals representative of said cable's rotations.

5. The system of claim 3 further comprising electrical means for detecting whether said lamp means are burned out, wherein said detecting means comprises means for measuring electrical current used by said lamp means and comparator means for comparing the measured current level with a preselected range and for providing said control means with the results of the comparison.

6. The system of claim 5 wherein said control means includes means for slowing the flashing rate of said lamp means when said detecting means detects a burn out.

7. A circuit for controlling the operation of directional lights on a motorcycle having right lamp means and left lamp means, said circuit comprising:
 (a) electronic control means including memory means;
 (b) a first, left-turn switch which, when pushed, provides a first electrical signal to said control means;
 (c) a second, right-turn switch which, when pushed, provides a second electrical signal to said control means;
 (d) means for measuring the speed of the motorcycle and providing a third electrical signal representative of the measured speed to said control means;
 (e) wherein when said control means receives one of said first signal said control means activates said left lamp means for a distance not exceeding a maximum distance determined by said memory means;
 (f) further wherein when said control means receives one of said second signals said control means activates said right lamp means for a distance not exceeding a maximum distance determined by said memory means;
 (g) further wherein when said control means simultaneously receives one of said first signals and one of said second signals said control means activates both said right and left lamp means until against receiving a simultaneous first and second signals;
 (h) wherein said memory means determines activation distances based on said third signal; and
 said circuit further comprising lamp current sensing means for determining whether said right and left lamp means are functioning properly and providing a warning indication if said lamp means are not functioning properly.

8. The circuit of claim 7 wherein said control means comprises a microprocessor containing said memory means.

9. The circuit of claim 8 further comprising means for conditioning said first, second and third signals prior to being used by said microprocessor.

10. The circuit of claim 9 wherein said memory means comprises a lookup table wherein different activation distances correspond and are generated in response to said third signal.

11. The circuit of claim 10 further comprising a power source providing current to said circuit; and wherein said current sensing means comprises:

(a) a detector between said power source and said right and left lamp means;
(b) means for comparing the flow of current through said detector to a reference current flow; and
(c) means for generating fourth and fifth electrical signals to said control means each indicative of the comparison between said reference current flow and the current flow through said detector.

12. The circuit of claim 11 wherein said power source is a battery and said detector is a resistor.

13. The circuit of claim 12 wherein said comparing means comprises a plurality of resistors configured as voltage dividers providing signal to said fourth and fifth signal generating means and wherein said fourth and fifth signal generating means comprises a plurality of comparators receiving said voltage divider signals and generating said fourth and fifth signals.

14. The circuit of claim 13 wherein said control means activates said right and left lamp means in a first mode when both lamp means are functioning in a preselected manner and in a second mode when said right and left lamp means are not functioning in said preselected manner to provide said warning indication, activation in said first mode and said second mode being based on said fourth and fifth signals.

* * * * *

UNITED STATES PATENT AND TRADEMARK OFFICE
CERTIFICATE OF CORRECTION

PATENT NO. : 4,972,174

DATED : November 20, 1990

INVENTOR(S) : Lance Onan

It is certified that error appears in the above-identified patent and that said Letters Patent is hereby corrected as shown below:

On the title page, add --[73] Assignee: Harley-Davidson, Inc., Milwaukee, Wisconsin--.

Signed and Sealed this

Tenth Day of December, 1991

Attest:

HARRY F. MANBECK, JR.

*Attesting Officer*  *Commissioner of Patents and Trademarks*